March 26, 1935. M. A. LAABS 1,995,680
OPHTHALMIC LENS AND PROCESS OF MAKING SAME
Filed Oct. 2, 1933
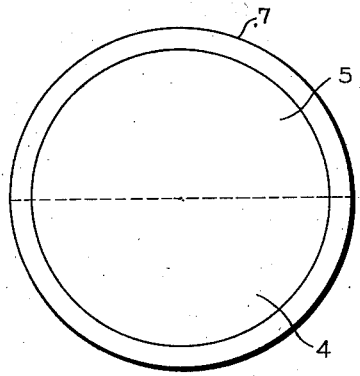
FIG. I.
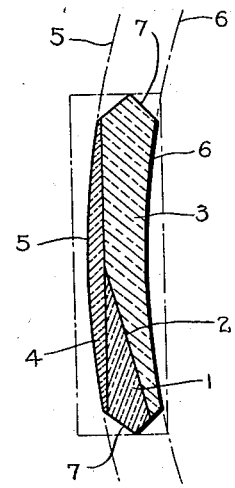
FIG. II.
INVENTOR
MAX. A. LAABS
BY Harry H. Styll
ATTORNEY Patented Mar. 26, 1935

1,995,680

UNITED STATES PATENT OFFICE 1,995,680

OPHTHALMIC LENS AND PROCESS OF MAKING SAME

Max A. Laabs, Southbridge, Mass., assignor to American Optical Company, Southbridge, Mass., a voluntary association of Massachusetts Application October 2, 1933, Serial No. 691,809

4 Claims. (Cl. 88—54)

This invention relates to lenses and particularly to lenses having a variable shade, and to an improved process of making the same.

One of the principal objects of the invention is to provide means whereby a prescription surface may be ground on the lens without altering or interfering with the variable shaded portion thereof.

Another object of the invention is to provide an improved variable colored prescription lens.

Another object of the invention is to provide an improved process of making such lenses.

Other objects and advantages of the invention will become apparent by reference to the following description taken in connection with the accompanying drawing. It will be apparent that many changes can be made in the arrangement of parts and details of construction without departing from the spirit of the invention as expressed in the accompanying claims, the preferred forms and steps of the process being shown and described by way of illustration only.

Referring to the drawing:

Fig. I is a front view of a lens embodying the invention, and

Fig. II is a cross section in line II—II of Fig. I, showing the blank from which the lens is made in dot and dash lines.

Lenses having a portion of white or uncolored glass, and a portion of colored glass of varying density of shade have been made by making the colored portion wedge shaped on the white portion. Such lenses met the situation very well where the lenses were merely protection lenses without optical power. There are many cases however where it is desirable to make such lenses to certain prescriptive powers required by the eyes of certain consumers. When it was attempted to grind the prescription curve on the face of the blank having the wedge, the thickness of the wedge was altered, which of course altered the density of the desired color shade. It is therefore an important object of my invention to produce such prescription lenses without alteration of the color density of the shaded part.

Referring to the drawing wherein like reference characters denote like parts throughout, the blank for the lens is made by fusing a wedge shaped piece of colored glass 1, to the bevelled off face 2 of a white piece of glass 3. On top of the wedge 1 and the piece 3 I fuse a cover piece 4 of white glass. I next grind and polish the top face of the blank to the prescription surface 5. I then grind and polish the other face of the blank to the prescription surface 6. The lens may be bevelled at 7 to fit the rim of a spectacle.

I have described the glass 1 as colored, and the glasses 3 and 4 as white, it is clear that any desired colors may be used for each of the glasses as desired. The surfaces 5 and 6 may be any desired optical surface—spherical—cylindrical—toric, atoric or aspherical as needed or desired. The lenses may be made rimless or bevelled for rims as desired, and the relative size and relation of the shaded portion may be made as desired. If desired the layers of glass may be cemented together instead of being fused. Canada balsam can be used as a cement to cement them together.

From the foregoing it will be seen that I have provided means and processes well adapted to obtain all of the objects and advantages of the invention in a simple efficient and economical way.

Having described my invention I claim:

1. A blank for an ophthalmic lens having a shade portion of predetermined varied density through the different portions thereof and which will not be changed when the optical surfaces are formed on the exposed surfaces of the blank comprising a layer of clear glass having two surfaces on one side thereof and a surface on its opposite side to be finished to an optical curvature, one of said first two surfaces being inclined to the other, said inclined surface having a wedge shaped block of colored glass secured thereto and having its surface opposite that secured to the inclined surface flush with the plane of the other of said first two surfaces and a layer of clear glass secured to the first piece of clear glass on the side thereof having the wedge of colored glass thereon and to the flush surface of said colored glass, said second layer of clear glass having an exposed surface adapted to be provided with a finished optical curvature and which will not alter the shape of the wedge of colored glass.

2. An ophthalmic lens having a shade portion of predetermined varied density through the different portions thereof and which will not change when the optical surfaces are formed on the exposed surfaces of the lens comprising a layer of clear glass having two surfaces on one side thereof, one of said two surfaces being inclined to the other, said inclined surfaces having a wedge shaped block of colored glass secured thereto and having its surface opposite that secured to the inclined surface flush with the plane of the other of said surfaces, a layer of clear glass secured to the first piece of glass on the side thereof having the wedge of colored glass thereon and to the flush surface of said colored glass, said first piece of clear glass having a finished optical surface on the exposed side thereof opposite that having the wedge of colored glass thereon and said second piece of clear glass having a finished optical surface on the exposed side thereof of the required curvature to produce the desired power in the finished lens, said finished optical surfaces being spaced from the wedge shaped piece of colored glass.

3. The process of making a blank for an ophthalmic lens having a shade portion of predetermined varied density through the different portions thereof comprising forming two intersecting surfaces on one side of a piece of clear glass, the second surface being inclined to the first, securing a piece of colored glass on the inclined surface of the first piece of glass, removing the side of said piece of colored glass opposite that secured to the inclined surface until a surface is formed flush with the plane of the other of said intersecting surfaces on the piece of clear glass and to shape said colored glass to a predetermined wedge shape, and securing a layer of clear glass to the first piece of clear glass on the side thereof having the colored glass thereon and to the flush surface on said colored glass to form a variable surface spaced from said piece of colored glass and which may be formed with a desired surface curvature without altering the shape of the piece of colored glass.

4. The process of making an ophthalmic lens having a shade portion of predetermined varied density through different portions thereof comprising forming two intersecting surfaces on one side of a piece of clear glass, the second surface being inclined to the first, securing a piece of colored glass on the inclined surface of the first piece of glass, removing the side of said piece of colored glass opposite that secured to the inclined surface until a surface is formed flush with the plane of the other of said intersecting surfaces on the clear piece of glass and to shape said colored piece of glass to a predetermined wedge shape, securing a layer of clear glass to the first piece of clear glass on the side thereof having the colored glass thereon and to the flush surface on said colored glass to form a variable surface spaced from said piece of colored glass, forming a finished optical surface on the exposed side of the first piece of clear glass and forming a finished optical surface on the exposed variable surface of the second piece of clear glass to form the power desired in the finished lens, said surfaces being formed without altering the shape of the colored piece of glass.

MAX A. LAABS.